(12) United States Patent
Shiao et al.

(10) Patent No.: US 8,780,449 B2
(45) Date of Patent: Jul. 15, 2014

(54) METHOD FOR COMPENSATING ABERRATION OF VARIABLE FOCUS LIQUID LENS

(75) Inventors: Yaojung Shiao, Taipei (TW); Eric Chiwei Shiao, Taipei (TW)

(73) Assignee: National Taipei University of Technology (TW)

( * ) Notice: Subject to any disclaimer, the term of this patent is extended or adjusted under 35 U.S.C. 154(b) by 235 days.

(21) Appl. No.: 13/300,693

(22) Filed: Nov. 21, 2011

(65) Prior Publication Data
US 2012/0127581 A1    May 24, 2012

(30) Foreign Application Priority Data
Nov. 23, 2010 (TW) ............................... 99143068 A

(51) Int. Cl.
G02B 1/06 (2006.01)
G02B 3/12 (2006.01)

(52) U.S. Cl.
USPC .......................... 359/665; 359/666; 359/667

(58) Field of Classification Search
USPC ................................................. 359/665–667
See application file for complete search history.

(56) References Cited

U.S. PATENT DOCUMENTS

| | | | |
|---|---|---|---|
| 7,545,575 B2 * | 6/2009 | Hendriks et al. | 359/665 |
| 2008/0247052 A1 * | 10/2008 | Hendriks et al. | 359/666 |
| 2008/0316610 A1 * | 12/2008 | Dobrusskin | 359/666 |
| 2010/0208357 A1 * | 8/2010 | Batchko et al. | 359/666 |
| 2012/0063000 A1 * | 3/2012 | Batchko et al. | 359/666 |

* cited by examiner

*Primary Examiner* — Evelyn A. Lester
(74) *Attorney, Agent, or Firm* — Schmeiser, Olsen & Watts, LLP

(57) ABSTRACT

A method for compensating an aberration of a variable focus liquid lens is configured to compensate the aberration associated with a first lens surface and a second lens surface of the liquid lens. The first lens surface is of a first radius of curvature. The second lens surface is of a second radius of curvature.

10 Claims, 4 Drawing Sheets

METHOD FOR COMPENSATING ABERRATION OF VARIABLE FOCUS LIQUID LENS

CROSS-REFERENCE TO RELATED APPLICATION

This non-provisional application claims priority under 35 U.S.C.§119(a) on Patent Application No(s). 099140368 filed in Taiwan, R.O.C. on Nov. 23, 2010, the entire contents of which are hereby incorporated by reference.

FIELD OF TECHNOLOGY

The present invention relates to a method for compensating an aberration of a variable focus liquid lens, in particular to an aberration compensation method to reduce the aberration produced by a non-solid lens.

BACKGROUND

In a conventional optical system, a lens is generally used for focusing and diffusing a light to zoom an observing object. However, there is an aberration problem of the lens when the object is observed, and the aberration problem may affect the image quality and may even cause deformations or blurred images. In particular, a spherical aberration is produced by projecting a light at a different position of the lens, such that the light is not be focused at the same focal point when it is projected and focused, but a focal plane will be produced instead to cause the aberration problem.

To overcome the aforementioned aberration problem, conventional methods adopt a non-spherical aberration lens or a complex lens to eliminate the aberration, but these technologies are applicable for transparent solid lenses such as glass lenses and inapplicable for non-solid lenses such as liquid lenses.

In a liquid lens, liquid is filled into the liquid lens, such that the liquid can be used to adjust the surface curvature of a film of the lens to constitute a convex lens or a concave lens. The change of the surface curvature provides the function of a variable focus or a variable magnifying power to the liquid lens. However, it is difficult or unable to adjust the surface curvature due to the shape of the lens surface of the conventional liquid lens, and thus a severe spherical aberration may occur at a high magnifying power and a poor image quality may result.

Therefore, it is a main subject of the present invention to provide a method to overcome the poor image caused by the aberration of the liquid lens.

SUMMARY

It is a one objective of the invention to provide a method for compensating an aberration of a variable focus liquid lens, wherein the average curvature radius ratio of the least spherical aberration of all power-magnifying from a high magnifying power to a low magnifying power of the variable focus liquid lens is selected, and then appropriate first and second films are selected according to a thickness ratio correlated to a film deformation ratio or a stiffness ratio of the first lens surface to the second lens surface to achieve a smaller aberration of the liquid lens at all power-magnifying.

To achieve the aforementioned objective, the present invention provides a method for compensating an aberration of a variable focus liquid lens, and the method is used for compensating the aberration produced by a first lens surface and a second lens surface of the variable focus liquid lens, wherein the first lens surface has a first radius of curvature and the second lens surface has a second radius of curvature. The method comprises the following steps. In step S1, the diameter and the lens thickness of the variable focus liquid lens and a refractive index of a liquid filled into the liquid lens are selected. In step S2, at least one of a plurality of power-magnifying is set after the diameter, the lens thickness, and the refractive index are selected, in order to determine a plurality of combinations of radii of curvature of the first lens surface and the second lens surface corresponding to the set power-magnifying. In step S3, a plurality of spherical aberrations is obtained from the combinations of radii of curvature. In step S4, the spherical aberration of the least value is identified, and then the combinations of radii of curvature corresponding to the least spherical aberration are obtained, so as to generate a curvature radius ratio. In step S5, at least another one of the power-magnifying of the lenses is set, and then the steps S1 to S4 are repeated until the curvature radius ratios corresponding to the power-magnifying of the lenses respectively are obtained, so as to obtain the average curvature radius ratio of the variable focus liquid lens. In step S6, the thickness ratio of the first lens surface to the second lens surface is calculated according to the average curvature radius ratio, wherein the thickness ratio of the first lens surface to the second lens surface correlates with a deformation ratio or a stiffness ratio. In step S7, a first film and a second film corresponding to the thickness ratio are selected, such that the first and second lens surfaces can be substituted by the first and second films, respectively.

Compared with the prior art, the present invention can overcome the aberration produced by a non-solid lens, and the aberration occurs since it is difficult or unable to adjust the surface curvature due to the shape of the lens surface of the conventional liquid lens, and thus a severe spherical aberration may occur at a high power-magnifying and a poor image quality may result. With the aberration compensation method of the present invention, the effect of obtaining a smaller aberration in all power-magnifying can be achieved.

In addition, the aforementioned effect of the present invention provides a liquid lens with a smaller aberration at all power-magnifying can be verified by simulations and practical operations.

BRIEF DESCRIPTION

DETAILED DESCRIPTION

The objects, characteristics and effects of the present invention will become apparent with the detailed description of the preferred embodiments and the illustration of related drawings as follows.

Figure 1:
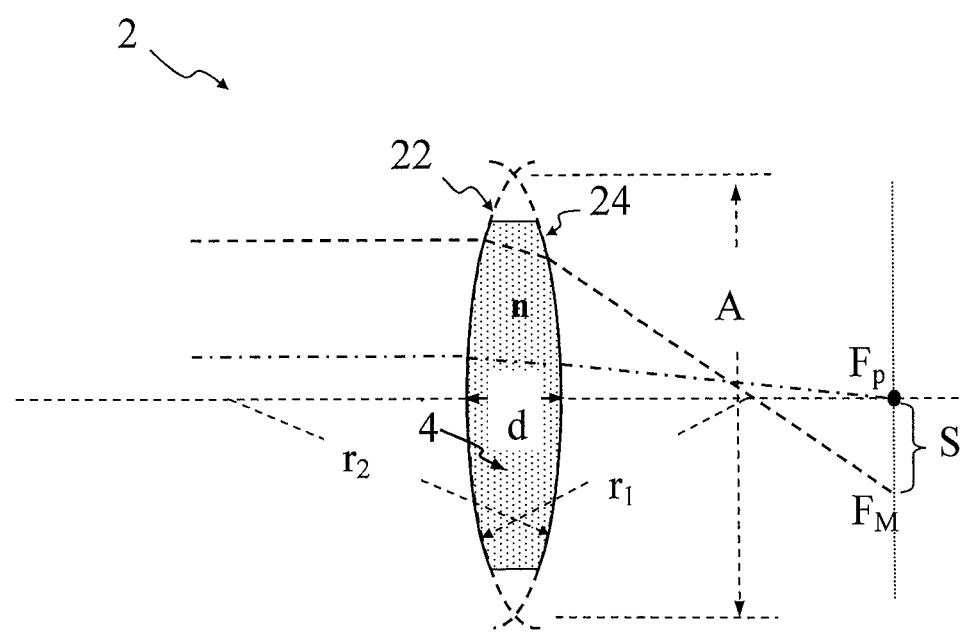
FIG. 1 is a schematic view of a variable focus liquid lens of the present invention.
Figure 2:
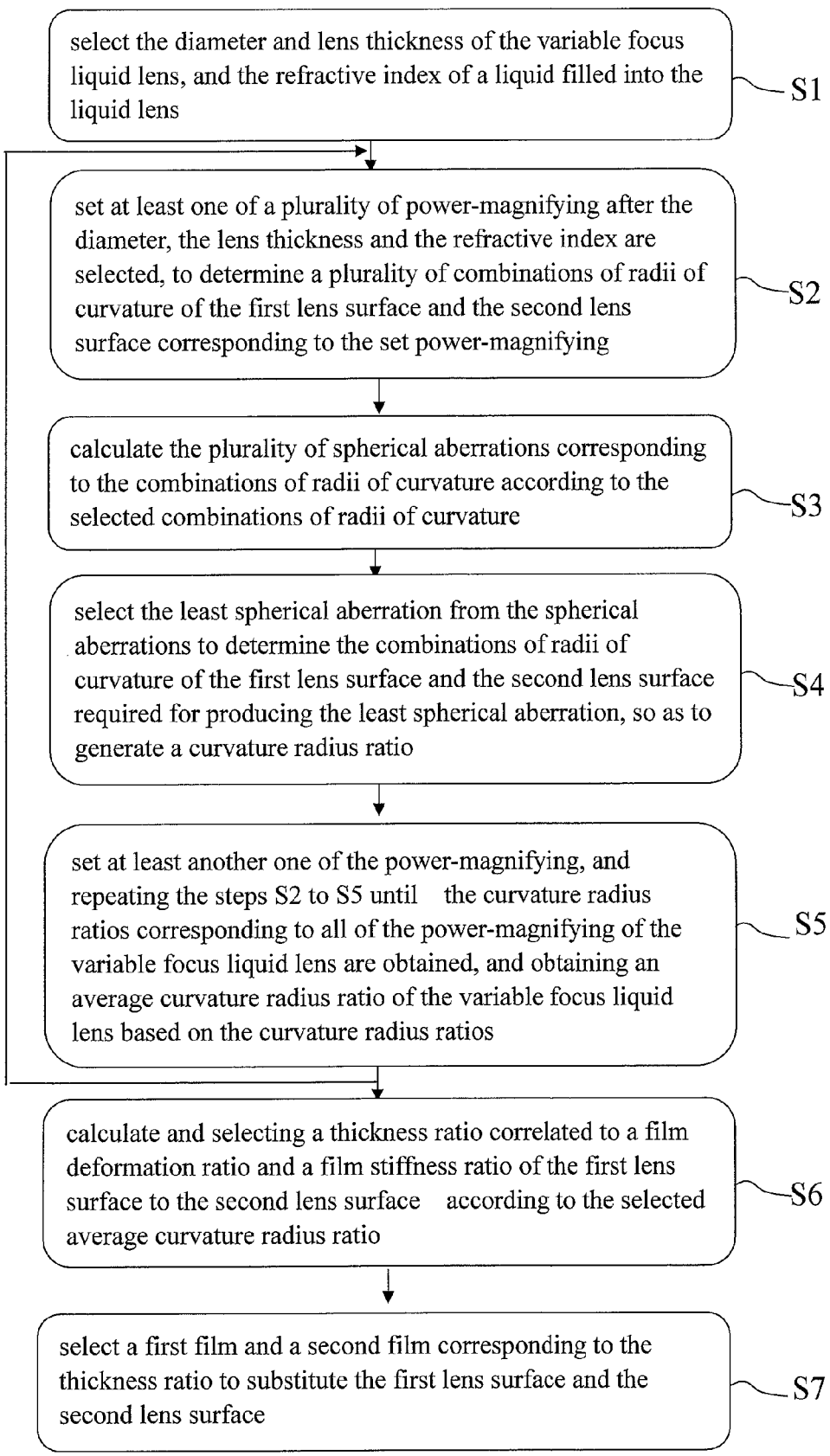
FIG. 2 is a flow chart of a method for compensating an aberration of a variable focus liquid lens in accordance with the present invention.

With reference to FIGS. 1 and 2 for a schematic view and a flow chart of a method for compensating an aberration of a variable focus liquid lens in accordance with the present invention respectively, FIG. 1 shows a method for compensating an aberration of a variable focus liquid lens applied for compensating the aberration S (which is equal to $|F_P-F_M|$) produced by a first lens surface 22 and a second lens surface 24 of the liquid lens 2, wherein the first lens surface 22 has a first radius of curvature $r_1$ and the second lens surface 24 has a second radius of curvature $r_2$.

In FIG. 2, the method for compensating an aberration of a variable focus liquid lens comprises the following steps:

Step S1: Select the diameter A and lens thickness d of the variable focus liquid lens 2 and a refractive index n of a liquid 4 filled into the liquid lens.

Step S2: Set at least one of a plurality of power-magnifying after the diameter, the lens thickness and the refractive index are selected, to determine a combinations of radii of curvature of the first lens surface and the second lens surface.

Step S3: Calculate a plurality of spherical aberrations corresponding to the combinations of radii of curvature respectively based on the selected combinations of radii of curvature.

Step S4: Select the least spherical aberration from the spherical aberrations to determine the first lens surface and the second lens surface required by the combinations of radii of curvature of the least spherical aberration to generate a curvature radius ratio.

Step S5: Set at least another one of the power-magnifying, and repeat the steps S2 to S5 until the curvature radius ratio corresponding to all power-magnifying of the variable focus liquid lens is obtained, and obtain an average curvature radius ratio of the variable focus liquid lens based on the curvature radius ratios.

Step S6: Calculate a thickness ratio correlated to the film deformation ratio or film stiffness ratio of the selected first lens surface to the selected second lens surface according to the selected average curvature radius ratio.

Step S7: Finally, select a first film and a second film corresponding to the thickness ratio to substitute the first lens surface and the second lens surface respectively.

In the aforementioned preferred embodiment, the curvature radius ratio, the film deformation ratio, the film stiffness ratio are represented by the following formulas respectively.

Curvature Radius Ratio: $P_{min}=r_1/r_2$, where $P_{min}$ is the curvature radius ratio, and $r_1$ and $r_2$ are the first radius of curvature and the second radius of curvature respectively.

Film Deformation Ratio: $T=\Delta l_{r1}/\Delta l_{r2}$, where T is the film deformation ratio, and $\Delta l_{r1}$ and $\Delta l_{r2}$ are the first expanded deformation and the second expanded deformation respectively.

Film Stiffness Ratio: $T=K_2/K_1$, where T is the film stiffness ratio, and $K_1$ and $K_2$ are the stiffness coefficient of the first lens surface and the stiffness coefficient of the second lens surface respectively.

In addition, the film deformation ratio and the film stiffness ratio can be used for determining the thickness ratio of the first film to the second film, and are correlated by $T=\Delta l_{r1}/\Delta l_{r2}=K_2/K_1=t_2/t_1$, where $t_1$ and $t_2$ are the first film thickness and the second film thickness respectively. In the Step S5, the power-magnifying are used for calculating the average curvature radius ratio by a weighted average method. In a preferred embodiment, the weighted average can be weighted in a direct proportion to the corresponding curvature radius ratio according to the power-magnifying from a high magnifying power to a low magnifying power. In other words the higher the magnifying power, the higher weight value is obtained, and vice versa.

If the liquid is filled into the liquid lens from the first film and the second film selected by the method of the present invention, the liquid will produce an expanded deformation since the first film or the second film is expanded convexly outward, wherein the expanded deformation and the first radius of curvature or second radius of curvature corresponding to the first film or the second film are correlated as represented by $\Delta l_i=2\cdot(r_i\cdot\sin^{-1}(r_d/r_i)-r_d)$, where $\Delta l_i$ is the expanded deformation, $r_i$ is the first radius of curvature or the second radius of curvature, $r_d$ is the diameter and $_i$ is equal to 1 or 2.

In the aforementioned steps, selected parameters of the first film and the second film are used for manufacturing the variable focus liquid lens to obtain a smaller aberration at all power-magnifying (including a high power-magnifying or a low power-magnifying of the power-magnifying). In other words, the present invention can provide a better image quality at all magnifying power. If the first film or the second film with a greater film thickness is aligned towards an observing object, an even smaller aberration can be achieved.

Figure 3:
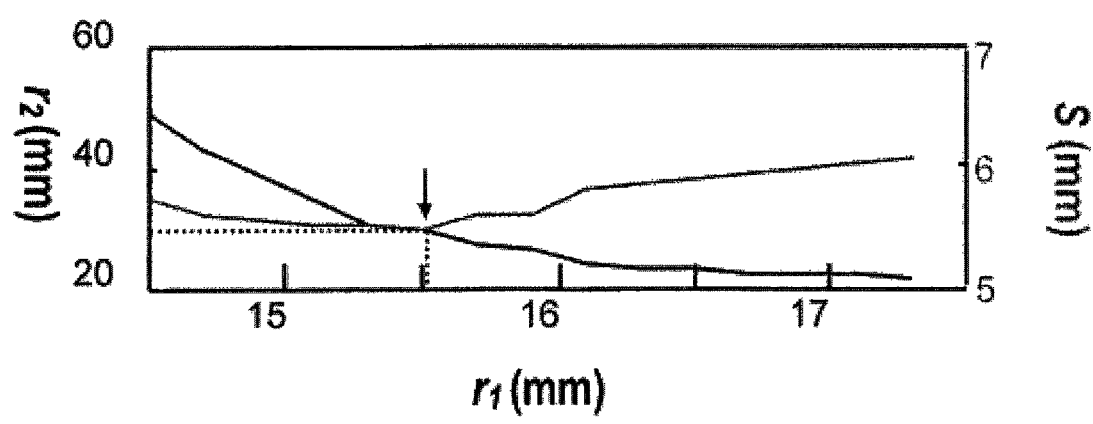
FIG. 3 is a schematic view of a simulation of an application in accordance with a preferred embodiment of the present invention.

With reference to FIG. 3 for a schematic view of a simulation of an application in accordance with the foregoing preferred embodiment, FIG. 3 shows the correlation of all combinations of radii of curvature of corresponding first radii of curvature $r_1$ and corresponding second radii of curvature $r_2$, provided that the simulation takes place under a condition of setting the power-magnifying of the variable focus liquid lens to 9.

In the simulation as shown in FIG. 3, if the selected first radius of curvature $r_1$ is 15.5 mm and the selected second radius of curvature $r_2$ is 29.9 mm, the least aberration S=5.5 mm can be obtained. In other words, the combination of radii of curvature can have the best curvature radius ratio $P_{min}=r_1/r_2$ e when the magnifying power is set to 9.

Figure 4A:
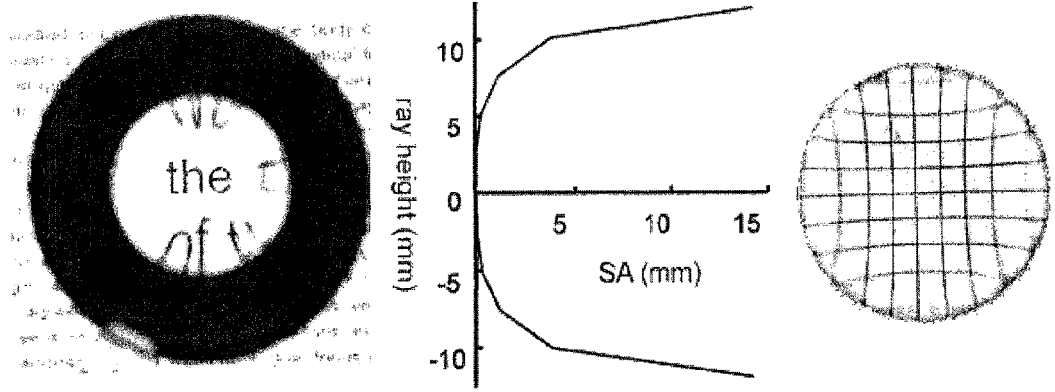
FIG. 4a is a schematic view of a conventional variable focus liquid lens.
Figure 4B:
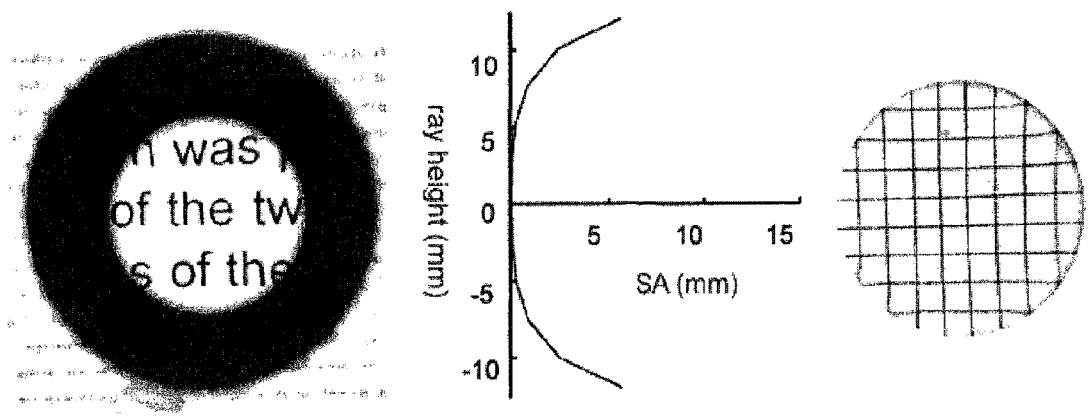
FIG. 4b is a schematic view of a variable focus liquid lens whose aberration is compensated in accordance with a preferred embodiment of the present invention.

With reference to FIGS. 4a and 4b for schematic views of comparing the aberration compensation of the prior art and the present invention when different film thicknesses and non-equal film thicknesses is adopted, the prior art adopts a film thickness ratio of 1 for the variable focus liquid lens manufactured by the first film and second film, and a good imaging effect occurs at the middle of the lens only, but the remaining peripheral areas have severe deformations as shown in the FIG. 4a.

Compared with FIG. 4b, the film thickness ratio of the variable focus liquid lens manufactured by the first film and the second film in accordance with the present invention is 6, the imaging effect is good, regardless of the middle or the peripheral areas of the lens as shown in FIG. 4b.

Compared with the prior art, the present invention can overcome the aberration problem produced by the conventional non-solid lens, wherein the aberration is difficult or unable to be adjusted due to the shape of the non-solid lens surface. In particular, the spherical aberration problem will become severer when the non-solid lens is at a high magnifying power and the spherical aberration definitely will affect the image quality of the non-solid lens. With the aberration compensation method of the present invention, a smaller aberration produced by the liquid lens at all power-magnifying can be achieved.

While the invention has been described by means of specific embodiments, numerous modifications and variations could be made thereto by those skilled in the art without departing from the scope and spirit of the invention set forth in the claims.

What is claimed is:

1. A method for compensating an aberration of a variable focus liquid lens, wherein, in step S1, the liquid lens has a selected diameter, a lens thickness, and a refractive index of a liquid filled into the liquid lens, the method being applied to compensate the aberration produced by a first lens surface and a second lens surface of the liquid lens according to the aforesaid requirements, the method comprising:

S2: selecting one of the lens magnifying powers which is produced according to the diameter, the lens thickness, and the refractive index, and obtaining a plurality of combinations of radii of curvature corresponding to the lens magnifying power selected, wherein each combination of radii of curvature corresponds to the first lens surface and the second lens surface;

S3: calculating spherical aberration corresponding to each combination of radii of curvature according to the obtained combinations of radii of curvature;

S4: selecting a least spherical aberration from the spherical aberrations to obtain the combination of radii of curvature corresponding to the least spherical aberration, so as to generate a curvature radius ratio of the first lens surface and the second lens surface according to the combination of radii of curvature corresponding to the least spherical aberration;

S5: selecting another one of the lens power-magnifying, and, obtaining a plurality of combinations of radii of curvature corresponding to the lens magnifying power selected, repeating the steps S2 through S5 until the curvature radius ratios corresponding to all the lens magnifying powers of the variable focus liquid lens respectively are obtained, and obtaining an average curvature radius ratio of the variable focus liquid lens based on the curvature radius ratios;

S6: calculating a film deformation ratio or a film stiffness ratio according to the radius of curvature corresponding to the first lens surface and the second lens surface of the selected average curvature radius ratio, wherein the film deformation ratio or the film stiffness ratio is a thickness ratio; and S7: selecting a first film and a second film corresponding to the thickness ratio and using the selected first film and second film as the first lens surface and the second lens surface for compensating the aberration of the liquid lens, respectively.

2. The method as recited in claim 1, wherein the curvature radius ratio is represented by $P_{min}=r_1/r_2$ further wherein $P_{min}$ is the curvature radius ratio, $r_1$ and $r_2$ are the first radius of curvature and the second radius of curvature of the first lens surface and the second lens surface according to the selected combinations of radii of curvature, respectively.

3. The method as recited in claim 1, wherein, in step S5, the average curvature radius ratio of the curvature radius ratios is calculated by a weighted average method.

4. The method as recited in claim 3, wherein the weighted average is weighted in a direct proportion to the corresponding curvature radius ratio according to the power-magnifying from a high magnifying power to a low magnifying power.

5. The method as recited in claim 1, wherein the film deformation ratio is represented by $T=\Delta l_{r1}/\Delta l_{r2}$ further wherein T is the film deformation ratio, $\Delta l_{r1}$ and $\Delta l_{r2}$ are a first expanded deformation and a second expanded deformation which occur at radii of curvature corresponding to the average curvature radius ratio, respectively.

6. The method as recited in claim 1, wherein the film stiffness ratio is represented by $T=K_2/K_1$ further wherein T is the film stiffness ratio, $K_1$ and $K_2$ are the stiffness coefficient of the first lens surface and the stiffness coefficient of the second lens surface at the radii of curvature corresponding to the average curvature radius ratio, respectively.

7. The method as recited in claim 5, wherein the film deformation ratio and the stiffness ratio are used for determining the thickness ratio of the first film to the second film.

8. The method as recited in claim 6, wherein the film deformation ratio and the stiffness ratio are used for determining the thickness ratio of the first film to the second film.

9. The method as recited in claim 7, wherein the first film or the second film with a larger thickness is selected to align towards an observing object.

10. The method as recited in claim 1, wherein the first film or the second film produces an expanded deformation by a liquid filled into the liquid lens and expanded convexly outward, and the first radius of curvature or the second radius of curvature of the first film or the second film is represented by $\Delta l_i = 2 \cdot (r_i \cdot \sin^{-1}(r_d/r_i) - r_d)$, futher wherein $\Delta l_i$ is the expanded deformation, $r_i$ is the first radius of curvature or the second radius of curvature corresponding to the expanded deformation, $r_d$ is the diameter, and i is equal to 1 or 2.

* * * * *